US010370831B2

(12) United States Patent
Lavazza

(10) Patent No.: US 10,370,831 B2
(45) Date of Patent: Aug. 6, 2019

(54) HYDRAULIC ASSEMBLY FOR CONTROLLING A LIQUID

(71) Applicant: R.P.E. S.r.l., Carbonate (IT)

(72) Inventor: Alberto Lavazza, Cardano al Campo (IT)

(73) Assignee: R.P.E. S.r.l., Carbonate (IT)

( * ) Notice: Subject to any disclaimer, the term of this patent is extended or adjusted under 35 U.S.C. 154(b) by 0 days.

(21) Appl. No.: 15/126,505

(22) PCT Filed: Mar. 17, 2015

(86) PCT No.: PCT/IB2015/051960
§ 371 (c)(1),
(2) Date: Sep. 15, 2016

(87) PCT Pub. No.: WO2015/140720
PCT Pub. Date: Sep. 24, 2015

(65) Prior Publication Data
US 2017/0089048 A1    Mar. 30, 2017

(30) Foreign Application Priority Data
Mar. 17, 2014 (IT) .............. MI2014U0106

(51) Int. Cl.
*E03B 7/07* (2006.01)
*F16K 27/00* (2006.01)

(52) U.S. Cl.
CPC .............. *E03B 7/078* (2013.01); *E03B 7/072* (2013.01); *E03B 7/074* (2013.01); *E03B 7/075* (2013.01); *F16K 27/003* (2013.01); *Y10T 137/87885* (2015.04)

(58) Field of Classification Search
CPC ..................... F16K 27/003; Y10T 137/87885
USPC ......................................... 137/884
See application file for complete search history.

(56) References Cited

U.S. PATENT DOCUMENTS

| 3,506,029 | A | * | 4/1970 | Demler, Sr. ............. | F16L 41/03 137/561 R |
| 3,560,027 | A | * | 2/1971 | Graham ................. | F16L 41/03 285/130.1 |
| 4,524,807 | A | * | 6/1985 | Toliusis .............. | F15B 13/0817 137/269 |
| 4,782,852 | A | * | 11/1988 | Legris .................. | F16L 37/252 137/269 |
| 5,089,131 | A | | 2/1992 | Gentry | |
| 5,178,191 | A | * | 1/1993 | Schaefer ............. | F15B 13/0821 137/269 |
| 5,855,224 | A | | 1/1999 | Lin et al. | |
| 6,012,479 | A | * | 1/2000 | Fukushima .......... | F16K 27/003 137/271 |

(Continued)

FOREIGN PATENT DOCUMENTS

DE    298 06 644    8/1998

*Primary Examiner* — John Fox
(74) *Attorney, Agent, or Firm* — Leason Ellis LLP

(57) ABSTRACT

A hydraulic assembly for controlling a liquid is provided with a plurality of hydraulic modules connected to one another; wherein each hydraulic module comprises a base element in which a liquid runs in use; a base element comprising a base body, a first connector and at least one second connector; the first connector and the second connector can be mutually coupled; and an interactive element, coupled to the base element and configured to interact with the liquid running in the base element.

17 Claims, 4 Drawing Sheets

(56) References Cited

U.S. PATENT DOCUMENTS

| | | | | |
|---|---|---|---|---|
| 6,058,975 A * | 5/2000 | Hui-Chen | F16K 11/20 | 137/271 |
| 6,269,834 B1 * | 8/2001 | Huhnen | F15B 13/0817 | 137/269 |
| 6,568,713 B1 * | 5/2003 | Bruvry | F16L 37/144 | 285/133.21 |
| 6,929,032 B2 * | 8/2005 | Rehder | F16K 27/003 | 137/884 |
| 7,261,121 B2 * | 8/2007 | Bordonaro | F16K 27/003 | 137/269 |
| 7,370,674 B2 * | 5/2008 | Doyle | F15B 13/0817 | 137/884 |
| 7,451,778 B2 * | 11/2008 | Bordonaro | F15B 13/0817 | 137/269 |
| 2012/0305084 A1 * | 12/2012 | Ball | G01F 15/14 | 137/1 |

\* cited by examiner

HYDRAULIC ASSEMBLY FOR CONTROLLING A LIQUID

CROSS REFERENCE TO RELATED APPLICATIONS

The present application is a U.S. National Phase of International Patent Application PCT/IB2015/051960 filed on Mar. 17, 2015, which claims priority to Italian Application No. MI2014U000106, filed on Mar. 17, 2014, each of which is incorporated by reference as if expressly set forth in their respective entireties herein.

TECHNICAL FIELD

The present invention relates to a hydraulic assembly for controlling a liquid.

In particular, the present invention relates to a hydraulic assembly for controlling a liquid which can be used, for example, in irrigation systems, inside household appliances, in the hydraulic circuits of whirlpool baths, in taps, in automatic beverage vending machines and in many other applications in which the selective control of a liquid is required.

BACKGROUND ART

Hydraulic assemblies, defined by a plurality of elements, such as, for example, filters, solenoid valves, water metering devices, pressure regulators etc., which are coupled to one another so as to form a composition adapted to control a flow of liquid, are known.

However, the hydraulic assemblies of known type require long assembly times and often do not guarantee freedom of composition of the hydraulic circuit.

DISCLOSURE OF INVENTION

It is thus an object of the present invention to make a hydraulic assembly which can be assembled in simple, rapid manner and at the same time guarantees maximum hydraulic circuit composition flexibility.

In accordance with such objects, the present invention relates to a hydraulic assembly for controlling a liquid comprising a plurality of hydraulic modules connected to one another; wherein each hydraulic module is provided with a base element in which a liquid runs in use; the base element comprising a base body, a first connector and at least one second connector; the first connector and the second connector can be mutually coupled; and with an interactive element, coupled to the base element and configured to interact with the liquid running in the base element.

By virtue of the fact that the base element of each hydraulic module comprises two connectors which can be connected to one another, all the base elements may be coupled directly to one another without needing to engage interconnection devices. Therefore, the coupling of the base elements of the hydraulic modules is simplified and the composition flexibility of a hydraulic circuit is optimized.

Furthermore, the coupling of a respective interactive element to each base module allows a rapid customization of each hydraulic module and, consequently, a rapid customization of the entire composition of the hydraulic assembly. Indeed, the hydraulic module assumes a specific function according to the type of coupled interactive element.

Furthermore, if the interactive elements shows a malfunction, it will be possible to choose whether to replace the interactive element without intervening on the base element or whether to replace the base element complete with the interactive element by disconnecting it from the adjacent modules.

According to a preferred embodiment of the present invention, the first connector is female and the second connector is male. Therefore, the coupling between the first and the second connector is simple, intuitive and rapid.

According to a preferred embodiment of the present invention, the interactive element is configured to operate on the liquid running in the base element.

Therefore, the hydraulic module controls the liquid by interrupting the flow thereof, adjusting the flow rate, adjusting the pressure, filtering it, etc.

According to a preferred embodiment of the present invention, the interactive element is configured to modify its state on the basis of the liquid running in the base element. Therefore, the hydraulic module comprising such an interactive element is configured to control the liquid by modifying its state, e.g. by measuring the liquid flow rate, measuring the pressure of the liquid, etc.

According to a preferred embodiment of the present invention, the interactive element is selected from the group comprising a filter, a solenoid valve, a valve, a pressure regulator, a water metering device, a pressure detector, a check valve etc.

Therefore, the hydraulic modules may be customized by coupling each base element according to a respective interactive element belonging to the assembly described above.

According to a preferred embodiment of the present invention, the interactive element is coupled to the base body of the base element. Therefore, it will be sufficient to couple the respective interactive element to the base body only in order to commit a given function to a hydraulic module. Therefore, the customization operations of the various hydraulic modules are simplified. Furthermore, the maintenance and replacement operations of the interactive elements are simplified and rapid.

According to a preferred embodiment of the present invention, the base bodies of the plurality of hydraulic modules are mutually identical. Therefore, the assembly and customization operations of the composition are simplified. Furthermore, the production costs of the hydraulic modules are reduced there being an identical portion which can be produced on large scale in each module.

According to a preferred embodiment of the present invention, the first connector and the second connector are configured so as to define a quick coupling. Therefore, the time necessary for coupling the hydraulic modules to one another is reduced and no tools are needed.

According to a preferred embodiment of the present invention, the first connector and the second connector are configured so as to define a bayonet type coupling. Therefore, the coupling between the various modules is obtained rapidly and simply by means of an axial movement to allow the introduction of the male connector in the female connector and a rotational movement to couple the male connector to the female connector.

According to a preferred embodiment of the present invention, the first connector and the second connector are aligned along an axis. Therefore, the base element allows the passage of the liquid without diverting it.

According to a preferred embodiment of the present invention, the first connector and the second connector are arranged transversely with respect to one another. Therefore, the base element diverts the liquid.

According to a preferred embodiment of the present invention, the base element comprises a third connector which can be coupled either to the first connector or to the second connector. Therefore, the base element defines three running ways for the liquid. By virtue of the fact that the third connector can be coupled either to the first or to the second connector, the base elements of the plurality of hydraulic modules can be coupled directly to one another without needing to engage specifically made interconnection devices. Furthermore, the base elements having three connectors may therefore be connected directly to the base elements having only two connectors, and vice versa.

According to a preferred embodiment of the present invention, the hydraulic assembly comprises at least one adapter element configured to couple the first connector and/or the second connector to a hydraulic element external to the hydraulic assembly. Therefore, the hydraulic circuit may be installed in a hydraulic circuit having any type of connections. Indeed, the adapter element can connect at least one of the free terminal connectors of the hydraulic assembly.

According to a preferred embodiment of the present invention, the hydraulic assembly comprises at least one T-shaped joint element. The freedom of composition of the hydraulic assembly is thus improved.

According to a preferred embodiment of the present invention, the hydraulic assembly comprises at least one L-shaped joint element. The freedom of composition of the hydraulic assembly is thus improved.

BRIEF DESCRIPTION OF THE DRAWINGS

Further features and advantages of the present invention will become apparent from the following description of a non-limitative embodiment thereof, with reference to the figures in the accompanying drawings, in which.

BEST MODE FOR CARRYING OUT THE INVENTION

Figure 1:
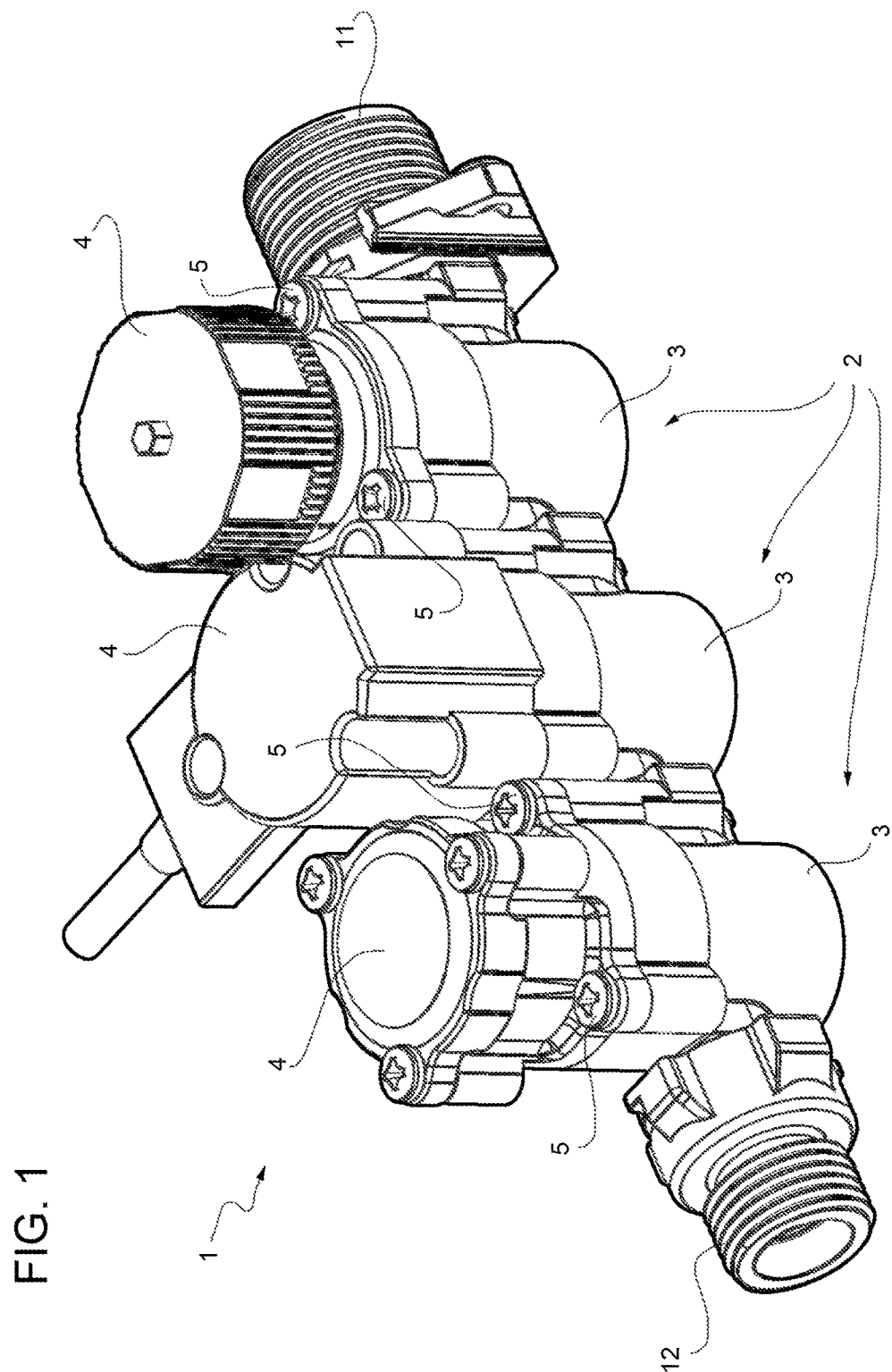
FIG. 1 is a perspective view of a first composition of a hydraulic assembly according to the present invention.

In FIG. 1, reference numeral 1 indicates a hydraulic assembly for controlling a liquid in accordance with the present invention.

The hydraulic assembly 1 comprises a plurality of hydraulic modules 2 connected to one another.

In the non-limiting example shown in FIG. 1, the hydraulic assembly 1 comprises three hydraulic modules 2 coupled to one another in series, so that the liquid flows in sequence in each hydraulic module 2 of the hydraulic assembly 1.

It is understood that the composition of the hydraulic assembly 1 may vary according to control needs, as will be seen below with regards to a second example of embodiment of the hydraulic assembly according to the present invention.

Each hydraulic module 2 is provided with a base element 3, in which the liquid flows in use and an interactive element 4 coupled to the base element 3 and configured to interact with the liquid running in the base element 3. Preferably, each base element 3 is coupled to the interactive element 4 in three points (of which only two are shown in FIG. 1) by means of fastening screws 5. It is understood that the interactive module 4 and the respective base element 3 can be coupled in any possible manner, e.g. by interference, by snapping, by threading etc.

Figure 2:
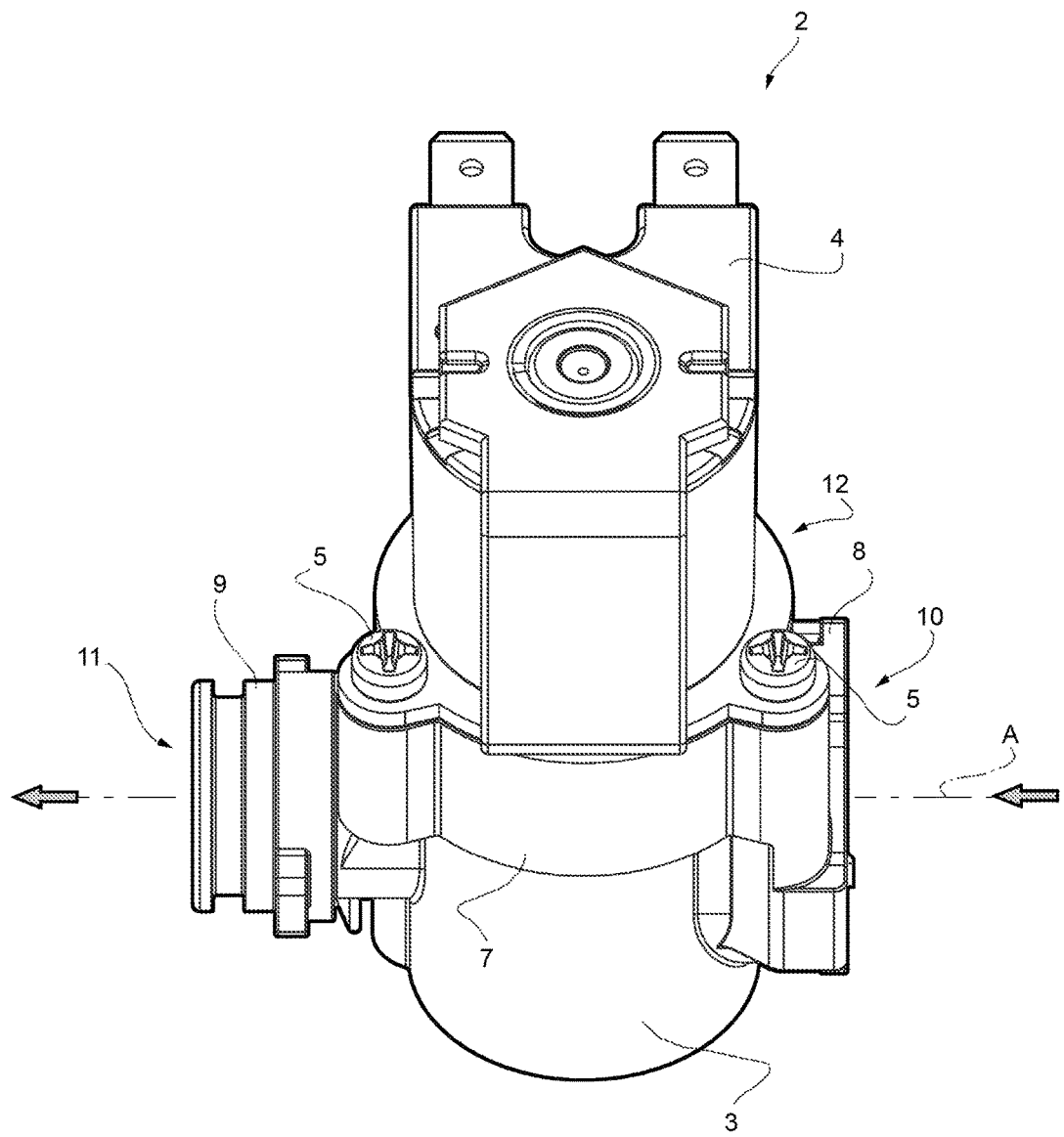
FIG. 2 is a perspective view of a detail in FIG. 1.

FIG. 2 shows a first embodiment of a hydraulic module 2, engaged in the hydraulic assembly 1 in FIG. 1.

The base element 3 of the hydraulic module 2 comprises a base body 7, a first connector 8 and a second connector 9.

Figure 4:
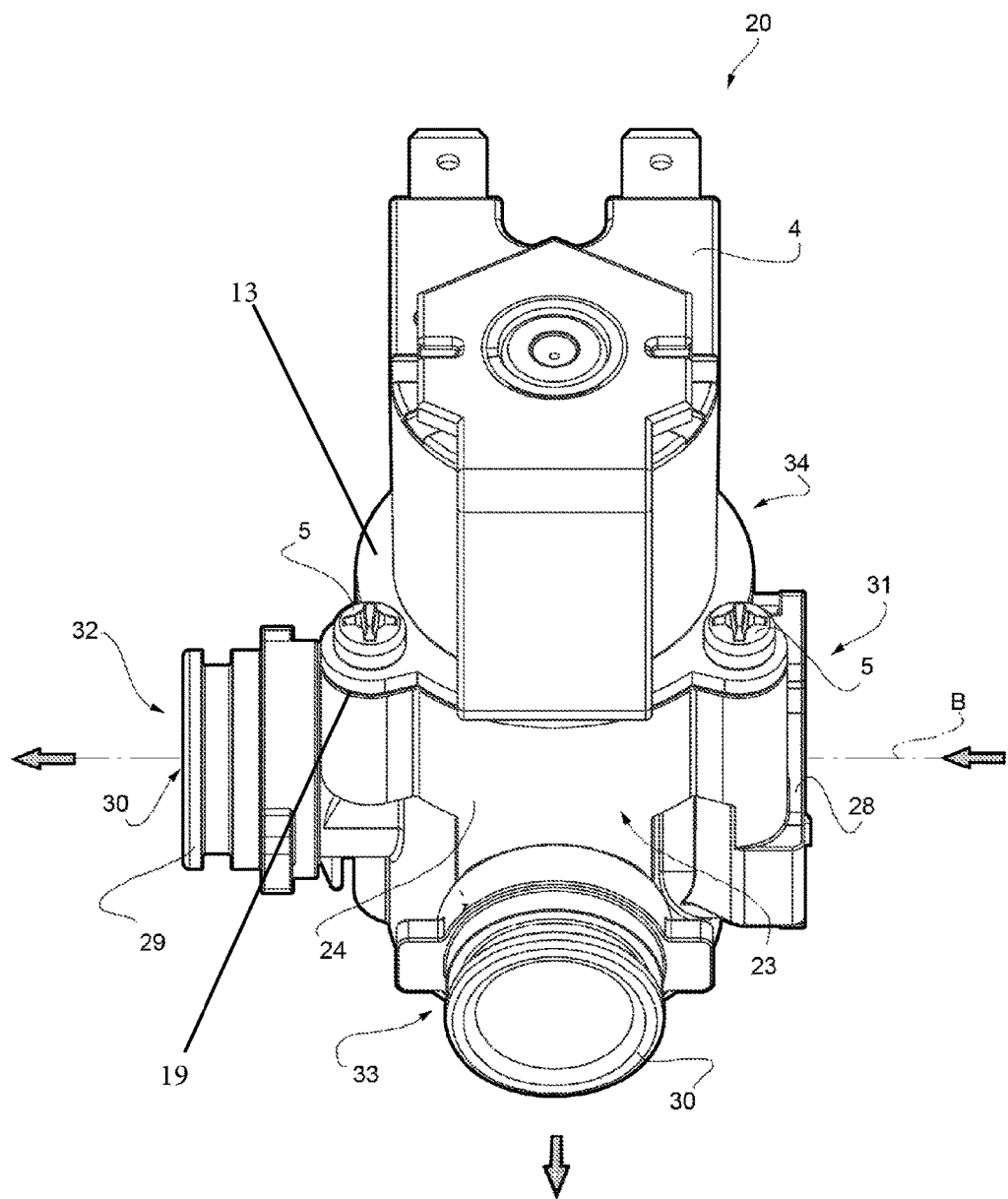
FIG. 4 is a perspective view of a detail in FIG. 3.

A base body 7 is coupled to the first connector 8, to the second connector 9 and to the respective interactive element 4. As shown in FIG. 4, the interactive element 4 includes a planar mounting flange 13 that seats against a planar mounting surface 19 at the open end of the base body 7; 24.

The base body 7 is a hollow body provided with a first opening 10 coupled to the first connector 8, with a second opening 11 coupled to the second connector 9 and with a third opening 12 (not clearly shown in FIG. 2) coupled to the interactive element 4. The base body 7 thus defines a cavity having three openings (not shown in the accompanying figures) in which the liquid runs in use.

The first connector 8, the second connector 9 and the interactive element 4 are in fluid communication with the cavity defined by the base body 7.

In particular, the cavity is shaped so as to convey the input liquid through either the first connector 8 or the second connector 9 towards the interactive element 4 so as to promote the interaction between the liquid and the interactive element 4.

Preferably, the first connector 8 and the second connector 9 are made in one piece with the base body 7, while the interactive element 4 is coupled to the base body 7 in three points (only two of which are shown in FIG. 1) by means of the fastening screws 5.

In the non-limiting example shown in FIG. 1, the liquid enters through the first connector 8, interacts with the interactive element 4 and exits through the second connector 9 (as shown by the arrows in FIG. 1) in use.

It is understood that the liquid may run in the opposite direction, according to the configuration of the hydraulic assembly 1 in which the modular element 2 is comprised.

The first connector 8 and the second connector 9 can be mutually coupled. In particular, the first connector 8 is female while the second connector 9 is male.

Therefore, each base element 3 can be coupled directly to a further base element 3 without using interconnection elements and so as to define a modular structure of the hydraulic assembly 1 (FIG. 1).

In the non-limiting example described and illustrated here, the first connector 8 and the second connector 9 are aligned along an axis A.

In a variant (not shown), the first connector 8 and the second connector 9 are arranged transversely with respect to one another.

Preferably, the first connector 8 and the second connector 9 are configured so as to define a quick coupling. The expression "quick coupling" hereinafter means that the first connector 8 and the second connector 9 are configured so as to be coupled by means of quick and/or short movements and preferably without using tools/accessories.

In the non-limiting example described and illustrated here, the first connector 8 and the second connector 9 are shaped so as to define a coupling of the bayonet type. In a variant (not shown) the first connector 8 and the second connector 9 are made so as to define a snap coupling.

The interactive element 4 may be chosen from two types:

interactive elements configured to operate on the liquid running in the respective base element 3, such as, for example, filters, valves, solenoid valves, pressure regulators, flow rate regulators, flow rate reducers;

interactive elements configured to modify their state according to the liquid which flows inside the respective base element 3, which are, for example, water metering devices, pressure measuring devices, pressure presence detecting devices, temperature measuring devices, conductivity measuring devices.

In substance, the interactive element 4 of each hydraulic module 2 is selected from the group comprising a filter, a solenoid valve, a valve, a pressure regulator, a water metering device, flow rate regulators, flow rate reducers, pressure presence detecting devices, temperature measuring devices, conductivity measuring devices.

In the non-limitative example shown in FIG. 2, the interactive element 4 is a solenoid valve.

In the non-limitative example shown in FIG. 1, the interactive elements 4 engaged in the hydraulic assembly 1 are (in sequence from the right) an inspectable filter, a solenoid valve (configured to selectively interrupt the flow) and a pressure regulator.

With reference to FIG. 1, the hydraulic assembly 1 further comprises a first adapter element 11, configured to couple the first connector 8 of an initial hydraulic module 2 external to the hydraulic assembly 1 (not shown for the sake of simplicity in the accompanying figures), and a second adapter element 12, configured to couple the second connector 9 of a further hydraulic end module 2 to a further hydraulic module external to the hydraulic assembly 1 (not shown for the sake of simplicity in the accompanying figures).

In the non-limiting example described and illustrated here, the first adapter element 11 has a male bayonet type end, which can be coupled to a first female connector 8, and an end shaped so as to be coupled to the external hydraulic element. For example, the second end may be of different diameter and/or have a male bayonet profile, or a male threaded profile, a female ring nut profile, a female threaded profile, a female quick coupling profile, a male profile for coupling to flexible tubes etc.

Similarly, the second adapter element 12 has a female bayonet type end, which can be coupled to the second connector 9, and an end shaped so as to be coupled to the external hydraulic element.

Figure 3:
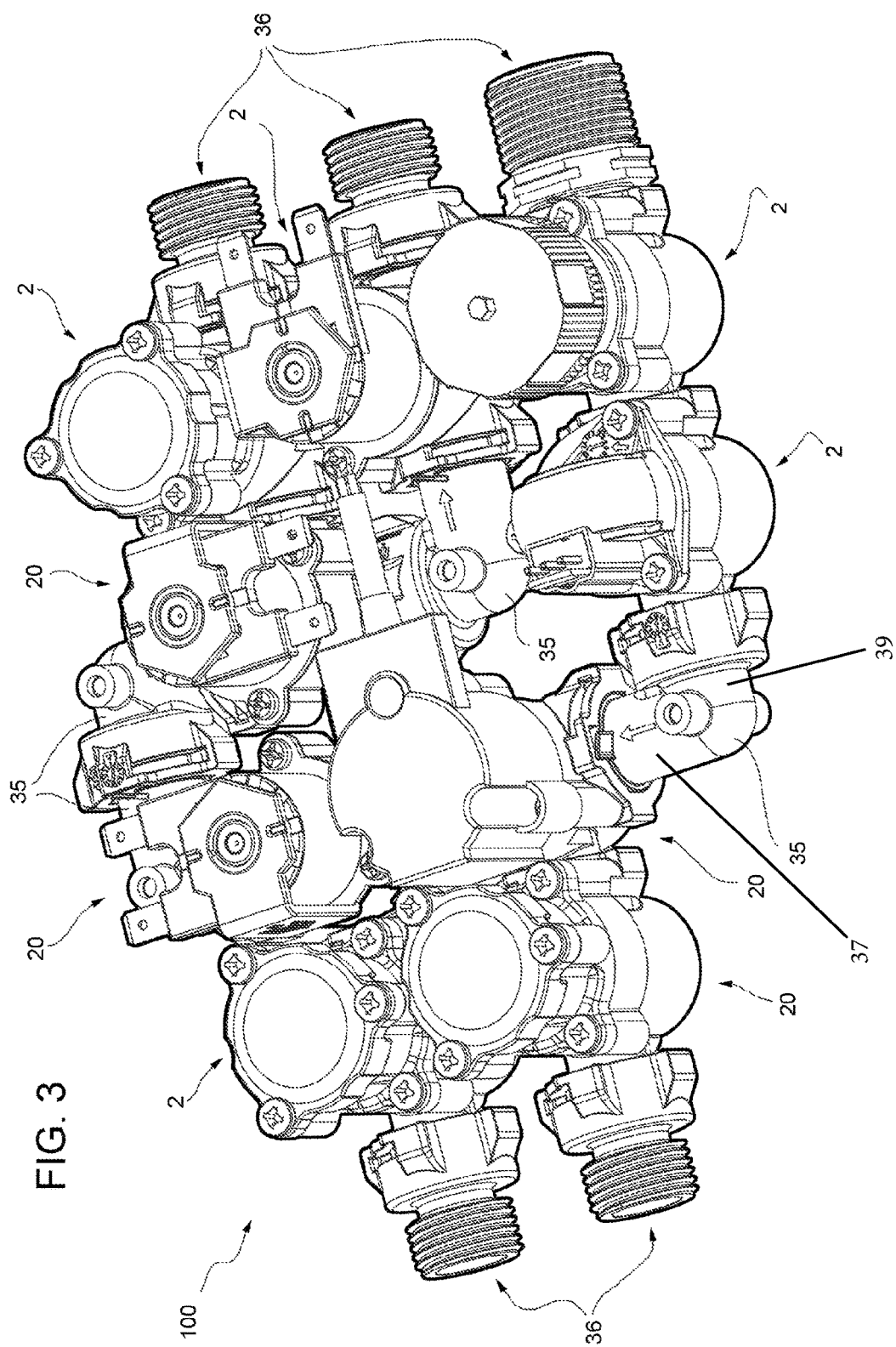
FIG. 3 is a perspective view of a second composition of a hydraulic assembly according to the present invention.

FIG. 4 shows a second embodiment of a hydraulic module 20 used in the hydraulic assembly 100 according to the present invention shown in FIG. 3. The hydraulic module 20 differs from the hydraulic module 2 exclusively for the presence of a base element 23 having a different structure from that of the base element 3. Therefore, the hydraulic module 20 will be provided with a base element 23, in which the liquid runs in use, and an interactive element 4, similar to the one previously described for the hydraulic module 2, coupled to the base element 23 and configured to interact with the liquid running in the base element 23.

The interactive element 4 has already been described above for the hydraulic module 2 and therefore will not be described further because it is substantially identical to the one used for the hydraulic module 2.

The base element 23 comprises a base body 24, a first connector 28, a second connector 29 and a third connector 30.

The hydraulic module 20 is thus provided with an additional connector (the third connector 30) with respect to the hydraulic module 2 described above.

A base body 24 is coupled to the first connector 28, to the second connector 29, to the third connector 30 and to the respective interactive element 4.

The base body 24 is a hollow body provided with a first opening 31 coupled to the first connector 28, with a second opening 32 coupled to the second connector 29, with a third opening 33 coupled to the third connector 30 and with a fourth opening 34 coupled to the interactive element 4. The base body 24 thus defines a cavity having four openings (not shown in the accompanying figures) in which the liquid runs in use.

The first connector 28, the second connector 29, the third connector 30 and the interactive element 4 are in fluid communication with the cavity defined by the base body 24.

In particular, the cavity is shaped so as to convey the input liquid through the first connector 28, the second connector 29 and the third connector 30, towards the interactive element 4 so as to promote the interaction between the liquid and the interactive element 4.

Preferably, the first connector 28, the second connector 29 and the third connector 30 are made in one piece with the base body 24, while the interactive element 4 is coupled to the base body 7 in three points (only two of which are shown in FIG. 3) by means of the fastening screws 5.

In the non-limiting example shown in FIG. 3, the liquid enters through the first connector 28, exits through the second connector 29 and interacts with the interactive element 4 exiting through the third connector 30 (as indicated by the arrows in FIG. 3) in use.

It is understood that the liquid may run in the opposite direction, according to the configuration of the hydraulic assembly 1 in which the modular element 2 is comprised.

The first connector 28 and the second connector 29 can be mutually coupled. In particular, the first connector 28 is female while the second connector 29 is male.

Therefore, each base element 23 can be coupled directly to a further base element 23 without using interconnection elements and so as to define a modular structure of the hydraulic assembly 1.

According to a preferred embodiment, the first connector 28 of the hydraulic module 20 can be coupled to the second connector 9 of the hydraulic module 2 and a second connector 29 of the hydraulic module 20 can be coupled also to the first connector 8 of the hydraulic module 2.

Therefore, it is possible to couple hydraulic modules with hydraulic modules 20 without needing to use interconnection elements as shown in the hydraulic assembly 100 in FIG. 3.

The third connector 30 can be coupled to the first connector 28. Therefore, the third connector 30 of a hydraulic module 20 can be coupled directly to the first connector 28 of a further hydraulic module 20 without using interconnection elements and so as to define a modular structure of the hydraulic assembly 1. According to a variant (not shown), the third connector 30 can be coupled to the second connector 29.

According to a preferred embodiment, the third connector 30 of the hydraulic module 20 can also be coupled to the first connector 8 of the hydraulic module 2. Therefore, it is possible to couple hydraulic modules 2 to hydraulic modules 20 without needing to use interconnection elements as shown in the hydraulic assembly 100 in FIG. 3.

In the non-limiting example described and illustrated here, the first connector 28 and the second connector 29 are arranged aligned along an axis B, while the third connector 30 is arranged transversely with respect to the first connector 28 and the second connector 29.

Preferably, the first connector 28 and the second connector 29 and the third connector 30 are configured so as to define a quick coupling by means of quick and/or short movements, and preferably without using tools/accessories.

In the non-limiting example described and illustrated here, the first connector 28, the second connector 29 and the third connector 30 are shaped so as to define a coupling of the bayonet type. A variant (not shown) provides for the first connector 28, the second connector 29 and the third connector 30 to be made so as to define a snap coupling or a threaded coupling.

FIG. 3 shows a further configuration of a hydraulic assembly 100 according to the present invention.

The hydraulic assembly 100 comprises hydraulic modules 2 (with only two connectors 8 and 9) and hydraulic modules (with three connectors 28 29 30).

The hydraulic assembly 100 further comprises four L-shaped joint elements 35 which are configured to connect, for example, two distinct hydraulic modules or to connect a hydraulic module to a further L-shaped joint element. In the illustrated example in FIG. 3, two joint elements 35 connect a hydraulic module 2 to a hydraulic module 20, while two joint elements 35 connect a hydraulic module 20 to a further joint element 35. The joint elements 35 in the non-limitative example shown have bayonet attachment ends. As shown in FIG. 3, the joint element 35 is defined by at least a first leg 37 that connects to one base element 3; 23 and a second leg 39 that connects to another base element 3; 23. The first connector 8;28 and the second connector 9;29 are aligned along an axis (A; B) and a distance, along axis (A; B), from the first connector 8; 28 and the second connector 9; 29 is greater than a length of each of the first leg 37 and the second leg 39. The first leg 37 is disposed 90 degrees relative to the second leg 39.

The hydraulic assembly according to the present invention may also comprise joint elements having different shapes, e.g. T-shaped joints (not shown).

The hydraulic assembly 100 further comprises a plurality of adapter elements 36 configured to couple the end connectors of the hydraulic assembly 100 to respective hydraulic elements external to the hydraulic assembly 100 (not shown for the sake of simplicity in the appended figures). Similarly to what described for the hydraulic assembly 1 in FIG. 1, the adapter elements 36 have a bayonet type end which can be coupled to the connectors of the hydraulic modules 2 and 20, and an end shaped so as to be coupled to the external hydraulic element having, for example, a threaded male end.

It is finally apparent that changes and variations may be made to the hydraulic assembly described herein without departing from the scope of the accompanying claims.

The invention claimed is:

1. A hydraulic assembly (1;100) for controlling a liquid comprising a plurality of hydraulic modules (2;20) connected to one another; wherein each hydraulic module (2;20) comprises:
   a base element (3;23), in which a liquid runs in use; the base element (3;23) comprising a base body (7;24), a first connector (8;28) and at least one second connector (9;29); the first connector (8;28) and the second connector (9;29) being of a mutually couplable design; the base body (7;24) defining a cavity in which the liquid runs in use, the base body (7;24) further including an open end and a closed end;
   at least one joint element (35) configured to connect the base elements (3;23) of the hydraulic modules (2;20);
   the hydraulic assembly (1;100) being characterized by comprising
   an interactive element (4), coupled to the open end of the base body (7;24) of the base element (3;23) and configured to interact with the liquid running in the cavity of the base element (3;23); the first connector (8), the second connector (9) and the interactive element (4) being in fluid communication with the cavity; the first connector (8) and the second connector (9) are made in one piece with the base body (7), wherein the interactive element (4) is disposed opposite the closed end of the base body (7;24) such that a longitudinal center axis of the interactive element (4) intersects the closed end of the base body (7;24);
   wherein the base bodies (7;24) of all of the plurality of hydraulic modules (2;20) have identical constructions and wherein at least two interactive elements have different constructions from one another;
   wherein the at least one joint element (35) is defined by at least a first leg that connects to one base element (3;23) and a second leg that connects to another base element (3;23), wherein the first connector (8;28) and the second connector (9;29) are aligned along an axis (A;B) and a distance, along axis (A;B), from the first connector (8;28) and the second connector (9;29) is greater than a length of each of the first leg and the second leg, the first leg being disposed 90 degrees relative to the second leg.

2. A hydraulic assembly according to claim 1, wherein the first connector (8;28) is female and the second connector (9;29) is male.

3. A hydraulic assembly according to claim 1, wherein the interactive element (4) is configured to operate on the liquid running in the base element (3;23).

4. A hydraulic assembly according to claim 1, wherein the interactive element (4) is configured to modify its state on the basis of the liquid running in the base element (3;23).

5. A hydraulic assembly according to claim 1, wherein the interactive element is selected from the group comprising at least one filter, solenoid valve, pressure regulator, water metering device, flow rate regulator, flow rate reducer, pressure presence detecting device, temperature measuring device, conductivity measuring device.

6. A hydraulic assembly according to claim 1, wherein the base bodies (7;24) of the plurality of hydraulic modules (2;20) are mutually identical.

7. A hydraulic assembly according to claim 1, wherein the first connector (8;28) and the second connector (9;29) are configured so as to define a quick coupling.

8. A hydraulic assembly according to claim 1, wherein the first connector (8;28) and the second connector (9;29) are configured so as to define a bayonet type coupling.

9. A hydraulic assembly according to claim 1, wherein the first connector (8;28) and the second connector (9;29) are aligned along an axis (A;B).

10. A hydraulic assembly according to claim 1, wherein the first connector and the second connector are arranged transversely with respect to one another.

11. A hydraulic assembly according to claim 1, wherein the base element (3;23) comprises a third connector (30), which can be coupled to one of the first connector (8;28) or to the second connector (9;29).

12. A hydraulic assembly according to claim 1, comprising at least one adapter element (11,12;36) configured to couple the first connector (8;28) and/or the second connector (9;29) to a hydraulic element external to the hydraulic assembly (1;100).

13. A hydraulic assembly according to claim 1, wherein the joint element (35) is T-shaped.

14. A hydraulic assembly according to claim 1, wherein the joint element (35) is L-shaped.

15. A hydraulic assembly according to claim 1, wherein the interactive element is detachably coupled to the base body and comprises a top portion of the hydraulic assembly and the base body comprises a bottom portion of the hydraulic assembly.

16. A hydraulic assembly according to claim 1, wherein the base body has a flow though direction and a central axis passing through the interactive element is perpendicular to the flow through direction.

17. A hydraulic assembly according to claim 1, wherein the interactive element (4) includes a planar mounting flange that seats against a planar mounting surface at the open end of the base body (7;24).

\* \* \* \* \*